(12) United States Patent
Ohyama

(10) Patent No.: US 8,831,669 B2
(45) Date of Patent: Sep. 9, 2014

(54) WIRELESS COMMUNICATION DEVICE, MOBILE PHONE AND WIRELESS COMMUNICATION DEVICE CONTROL METHOD

(75) Inventor: Junichi Ohyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 281 days.

(21) Appl. No.: 13/545,240

(22) Filed: Jul. 10, 2012

(65) Prior Publication Data

US 2013/0045772 A1  Feb. 21, 2013

(30) Foreign Application Priority Data

Aug. 17, 2011  (JP) .................. 2011-178517

(51) Int. Cl.
*H04B 7/00* (2006.01)
*H04W 52/28* (2009.01)
*H04W 52/56* (2009.01)
*H04W 52/14* (2009.01)
*H04W 52/08* (2009.01)

(52) U.S. Cl.
CPC .......... *H04W 52/283* (2013.01); *H04W 52/146* (2013.01); *H04W 52/08* (2013.01); *H04W 52/56* (2013.01)
USPC ..................... 455/522; 455/127.1; 455/343.2; 370/318

(58) Field of Classification Search
CPC ... H04W 24/00; H04W 72/042; H04W 28/04; H04W 52/0235; H04W 52/08; H04W 52/60; H04W 56/00; H04W 56/002; H04W 56/003; H04W 56/007; H04W 88/02; H04W 88/08; H04W 92/08; H04W 92/10; H04W 56/0005; H04W 56/0055; H04W 56/009; H04W 52/56
USPC .......... 455/127.1, 522, 502, 450, 574, 343.2, 455/13.4, 24; 370/350, 329, 342, 458, 311, 370/252, 318
See application file for complete search history.

(56) References Cited

U.S. PATENT DOCUMENTS

| | | | |
|---|---|---|---|
| 6,049,538 A * | 4/2000 | Scott ............................. | 370/347 |
| 6,788,963 B2 * | 9/2004 | Laroia et al. .................. | 455/574 |
| 8,391,814 B2 * | 3/2013 | Shute .......................... | 455/127.2 |
| 8,576,784 B2 * | 11/2013 | Löhr et al. .................... | 370/329 |
| 2006/0036134 A1 | 2/2006 | Tarassenko et al. | |
| 2006/0142043 A1 | 6/2006 | Matsumoto | |
| 2009/0017851 A1 * | 1/2009 | Li et al. ........................ | 455/502 |
| 2010/0098051 A1 * | 4/2010 | Uemura ........................ | 370/350 |

FOREIGN PATENT DOCUMENTS

| | | |
|---|---|---|
| JP | 2006-186757 A | 7/2006 |
| WO | 2004-027676 A2 | 4/2004 |

* cited by examiner

*Primary Examiner* — Sujatha Sharma
(74) *Attorney, Agent, or Firm* — Maschoff Brennan

(57) ABSTRACT

A wireless communication device includes a reference value acquiring unit configured to receive from a base station a timing adjustment value for use in adjusting a timing, and acquire a reference value associated with the received timing adjustment value, the reference value being a threshold for determining whether a transmission power is excessive, a variation acquiring unit configured to receive a transmission power control command transmitted by the base station, and sequentially acquire a variation in transmission power from the command, and a transmission power calculator configured to vary a transmission power value on the basis of the variation in transmission power when the transmission power value does not exceed the reference value, and configured to vary the transmission power value on the basis of a variation less than the variation in transmission power when the transmission power value exceeds the reference value.

6 Claims, 10 Drawing Sheets

FIG. 4

| VALUE FOR TA CONTROL | REFERENCE VALUE |
|---|---|
| 0 – 2564 | −25 dBm |
| 2565 – 5128 | −20 dBm |
| 5129 – 7692 | −15 dBm |
| 7693 – 10256 | −10 dBm |
| 10257 – 12820 | −5 dBm |
| 12821 – 15384 | 0 dBm |
| 15385 – 17948 | +5 dBm |
| 17949 – 20512 | +10 dBm |

SMALL

DISTANCE BETWEEN BASE STATION AND MOBILE PHONE

LARGE

WIRELESS COMMUNICATION DEVICE, MOBILE PHONE AND WIRELESS COMMUNICATION DEVICE CONTROL METHOD

CROSS-REFERENCE TO RELATED APPLICATION

This application is based upon and claims the benefit of priority of the prior Japanese Patent Application No. 2011-178517, filed on Aug. 17, 2011, the entire contents of which are incorporated herein by reference.

FIELD

The embodiments discussed herein are related to a wireless communication device, a mobile phone, and a wireless communication device control method.

BACKGROUND

A mobile wireless communication system includes a mobile station and a base station. The mobile station controls transmission power that is used when transmitting data in an up link (UL) (hereinafter referred to simply as "UL transmission power"). The base station receives data transmitted from the mobile station, and detects a reception level. Upon determining that the detected reception level is low, the base station transmits a command to increase the UL transmission power to the mobile station by using a down control channel. In contrast, upon determining that the detected reception level is high, the base station transmits a command to decrease the UL transmission power to the mobile station by using the down control channel. A transmit power control (TPC) value is contained in such a control command for UL transmission power. The mobile station receives a command transmitted from the base station. The command instructs the mobile station to control the UL transmission power. The mobile station then extracts a TPC value from the received command that instructs the mobile station to control the UL transmission power. Subsequently, the mobile station controls the value of the UL transmission power using the extracted TPC value. Here, in wireless communication systems, data is handled on a frame-by-frame basis, which is a time basis. At the time of transmitting and receiving data, subframes obtained by dividing a single frame are used for transmitting and receiving data. Control of the UL transmission power value by the mobile station is performed for each subframe.

In conventional UL transmission power control in wireless communication systems, upon receiving a control command from a base station, a mobile station performs control in accordance with the specified TPC value. Unfortunately, under deteriorated conditions of the propagation path from the base station, some of control commands for UL transmission power transmitted from the base station are erroneous, and these erroneous commands are transmitted from the base station in some cases. In these cases, there has been a possibility that although transmission power is to be decreased, the mobile station receives a control command for UL transmission power that instructs the mobile station to increase the transmission power. Accordingly, transmission power control that demands excessive transmission power would be performed, resulting in increased power consumption of the mobile station and interference with signals of other mobile stations on the base station side.

To address the above issues, there has been proposed a conventional technology in which, upon receiving commands to excessively increase transmission power from a base station, a mobile station performs mask processing that disregards control commands for UL transmission power from the base station. There has been proposed another conventional technology in which, in the case of not using a channel for exclusive use of packets, transmission of a control command using a transmission power control channel is not performed, so that wasteful consumption of wireless resources is avoided.

Japanese Laid-open Patent Publication No. 2006-186757 and International Publication Pamphlet No. WO 2004/027676 are examples of the related art.

Unfortunately, in the latter conventional technology, in which transmission of a control command using a transmission power control channel is stopped, it is not determined whether an instruction for increasing transmission power will result in excessive transmission power. This conventional technology therefore faces difficulty in imposing a limitation on an excessive increase in transmission power. In the former conventional technology, which disregards control commands from a base station when commands for excessively increasing transmission power are received, the distance between the base station and a mobile station is not taken into account. In reality, desirable UL transmission power varies as a function of the distance between a base station and a mobile station. In this conventional technology, unfortunately, there has been a difficulty in that whether transmission power is excessive is determined in accordance with the control distance, and thus there has been a difficulty in that UL transmission power is controlled appropriately in accordance with the distance between a base station and a mobile station.

SUMMARY

According to an aspect of the embodiments, an apparatus includes a wireless communication device including a reference value acquiring unit configured to receive from a base station a timing adjustment value for use in adjusting a timing, and acquire a reference value associated with the received timing adjustment value, the reference value being a threshold for determining whether a transmission power is excessive, a variation acquiring unit configured to receive a transmission power control command transmitted by the base station, and sequentially acquire a variation in transmission power from the command, and a transmission power calculator configured to vary a transmission power value on the basis of the variation in transmission power when the transmission power value does not exceed the reference value, and configured to vary the transmission power value on the basis of a variation less than the variation in transmission power if the transmission power value exceeds the reference value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 depicts an example association table representing the relationship between the timing advance (TA) control and the reference value.

DESCRIPTION OF EMBODIMENTS

Hereinafter, embodiments of a wireless communication device, a mobile phone, and a wireless communication device control method disclosed herein will be described in detail with reference to the accompanying drawings. The wireless communication device, the mobile phone, and the wireless communication device control method disclosed herein are not to be limited to the following embodiments. While a mobile phone is taken as an example of the wireless communication device in the following description, the wireless communication device is not limited thereto and may be any apparatus that wirelessly communicates with a base station.

First Embodiment

Figure 1:
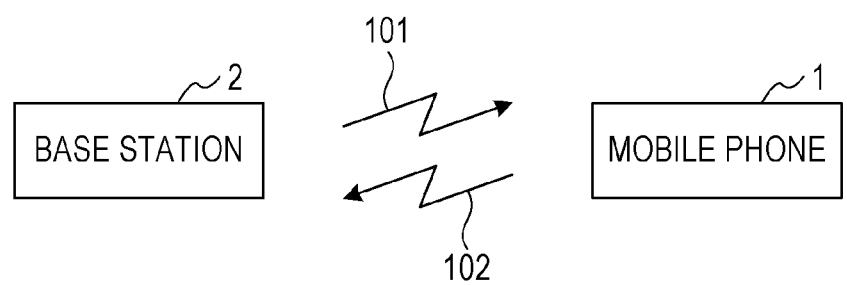
FIG. 1 is a schematic illustration for explaining the relation between a base station and a mobile phone.

FIG. 1 is a schematic illustration for explaining the relation between a base station and a mobile phone. As illustrated in FIG. 1, a mobile phone 1, which is a wireless communication device according to this embodiment, transmits and receives data packets to and from a base station 2 through wireless communication. The mobile phone 1 receives a radio signal 101 transmitted by the base station 2. The base station 2 receives a radio signal 102 transmitted by the mobile phone 1. Transmission and reception of data packets between the mobile phone 1 and the base station 2 are performed in a frame cycle. The mobile phone 1 and the base station 2 transmit and receive data packets on a subframe-by-subframe basis. Subframes are obtained by dividing a single frame by a given number.

The base station 2, for example, transmits a control command for transmission power containing a TPC value as the radio signal 101 to the mobile phone 1 for every subframe. The control command for transmission power contains a TPC value designating the amount by which transmission power is to be varied. The base station 2, for example, transmits a timing control signal for adjusting a timing at which a signal is transmitted from the mobile phone 1 to the base station 2, as the radio signal 101. With the timing control signal, the base station 2 instructs the mobile phone 1 to perform timing advance (TA) control using a transmission timing control command (sometimes referred to as "TA information"). The value for TA control, which is used for an instruction to advance or retard a transmission timing, is contained in a transmission timing control command. The value for TA control corresponds to an example of a "timing adjustment value."

The mobile phone 1 receives a control command for transmission power and a timing control signal from the base station 2. The mobile phone 1 then calculates a transmission power value using the received control command for transmission power and timing control signal, and transmits data using the calculated transmission power value. Calculation of the transmission power value by the mobile phone 1 will be described in detail later.

Figure 2:
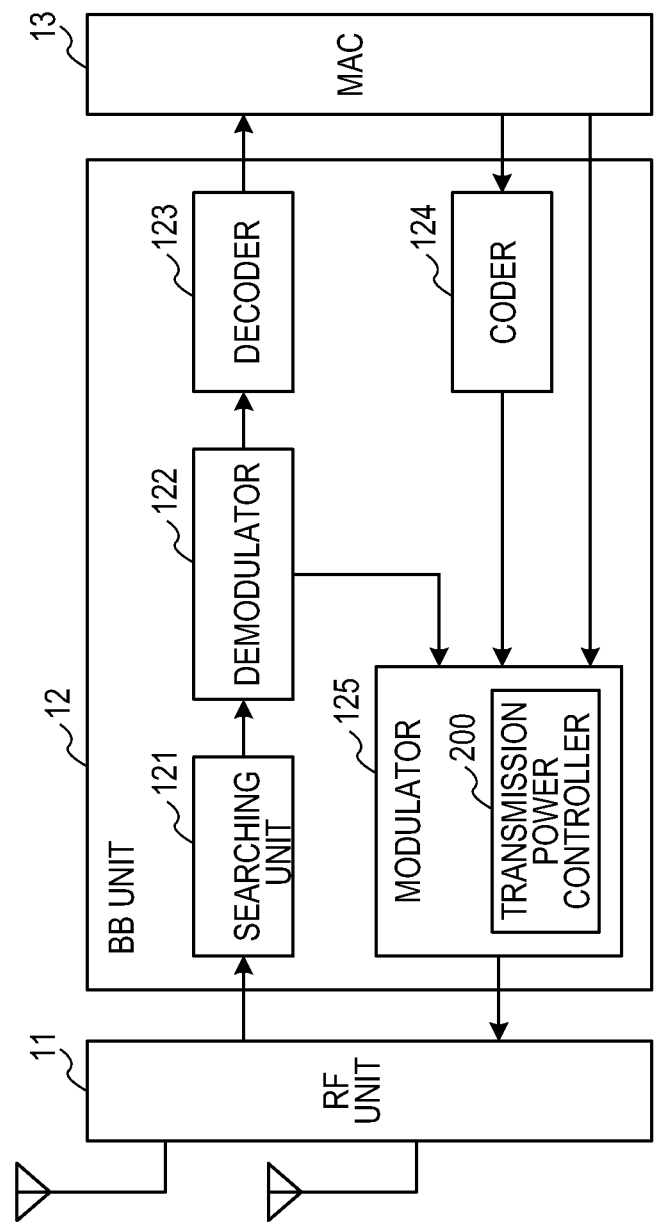
FIG. 2 is a block diagram of the mobile phone.

FIG. 2 is a block diagram of the mobile phone. As illustrated in FIG. 2, the mobile phone 1 includes a radio frequency (RF) unit 11, a base band (BB) unit 12, and a medium access controller (MAC) 13.

The RF unit 11 receives a radio signal transmitted from the base station 2 via an antenna. Then, the RF unit 11 downconverts the radio signal to a baseband signal, and outputs the downconverted signal, which is the baseband signal, to the BB unit 12. The RF unit 11 receives input of the baseband signal from the BB unit 12. Then, the RF unit 11 upconverts the received baseband signal to a radio signal. The RF unit 11 also receives input of a transmission power value from the BB unit 12. Then, the RF unit 11 transmits the radio signal obtained by upconversion to the base station 2 via an antenna using the received transmission power value.

The BB unit 12 includes a searching unit 121, a demodulator 122, a decoder 123, a coder 124, and a modulator 125.

The searching unit 121 receives input of a baseband signal from the RF unit 11. The searching unit 121 then identifies the base station 2 using the received baseband signal. Also, the searching unit 121 detects a path and a path timing, for example, using the received baseband signal. Then, the searching unit 121 outputs the baseband signal to the demodulator 122.

The demodulator 122 receives input of the baseband signal from the searching unit 121. The demodulator 122 then demodulates the received baseband signal. Subsequently, the demodulator 122 outputs the demodulated baseband signal to the decoder 123. The demodulator 122 acquires a control command for transmission power from the received baseband signal, and outputs the control command for transmission power to the modulator 125.

The decoder 123 receives input of the encoded baseband signal from the demodulator 122. The decoder 123 then performs decoding of the received baseband signal. Subsequently, the decoder 123 outputs the decoded baseband signal to the MAC 13.

The coder 124 receives, from the MAC 13, input of the baseband signal of data to be transmitted to the base station 2. The coder 124 then performs coding of the received baseband signal. Subsequently, the coder 124 outputs the coded baseband signal to the modulator 125.

The modulator 125 includes a transmission power controller 200. The modulator 125 receives, from the demodulator 122, input of a control command for transmission power transmitted from the base station 2. The modulator 125 receives, from the MAC 13, input of a timing control signal including a transmission timing control command transmitted from the base station 2.

Further, the modulator 125 receives, from the coder 124, input of the baseband signal of data to be transmitted to the base station 2. The modulator 125 then modulates the received baseband signal. Subsequently, the modulator 125 adjusts the transmission timing of the signal using the received timing control signal, and then outputs the modulated baseband signal to the RF unit 11.

The transmission power controller 200 calculates a transmission power value using the control command for transmission power and transmission timing control command received from the base station 2. The modulator 125 outputs the transmission power value calculated by the transmission power controller 200 to the RF unit 11. Calculation of a transmission power value by the transmission power controller 200 will be described in detail next.

The MAC 13 performs processing on the MAC layer between the mobile phone 1 and the base station 2, such as protocol analysis on a MAC header or the like. The MAC 13 receives input of a baseband signal from the decoder 123. The MAC 13 then performs processing on the MAC layer of the received baseband signal, and supplies the processed signal to an operator. The MAC 13 acquires a timing control signal including a transmission timing control command from the received baseband signal, and outputs the timing control signal to the modulator 125.

Further, the MAC 13 acquires transmission data input by an operator. The MAC 13 then performs processing on the MAC layer of the received transmission data to generate a baseband signal, and outputs the generated baseband signal to the coder 124.

Figure 3:
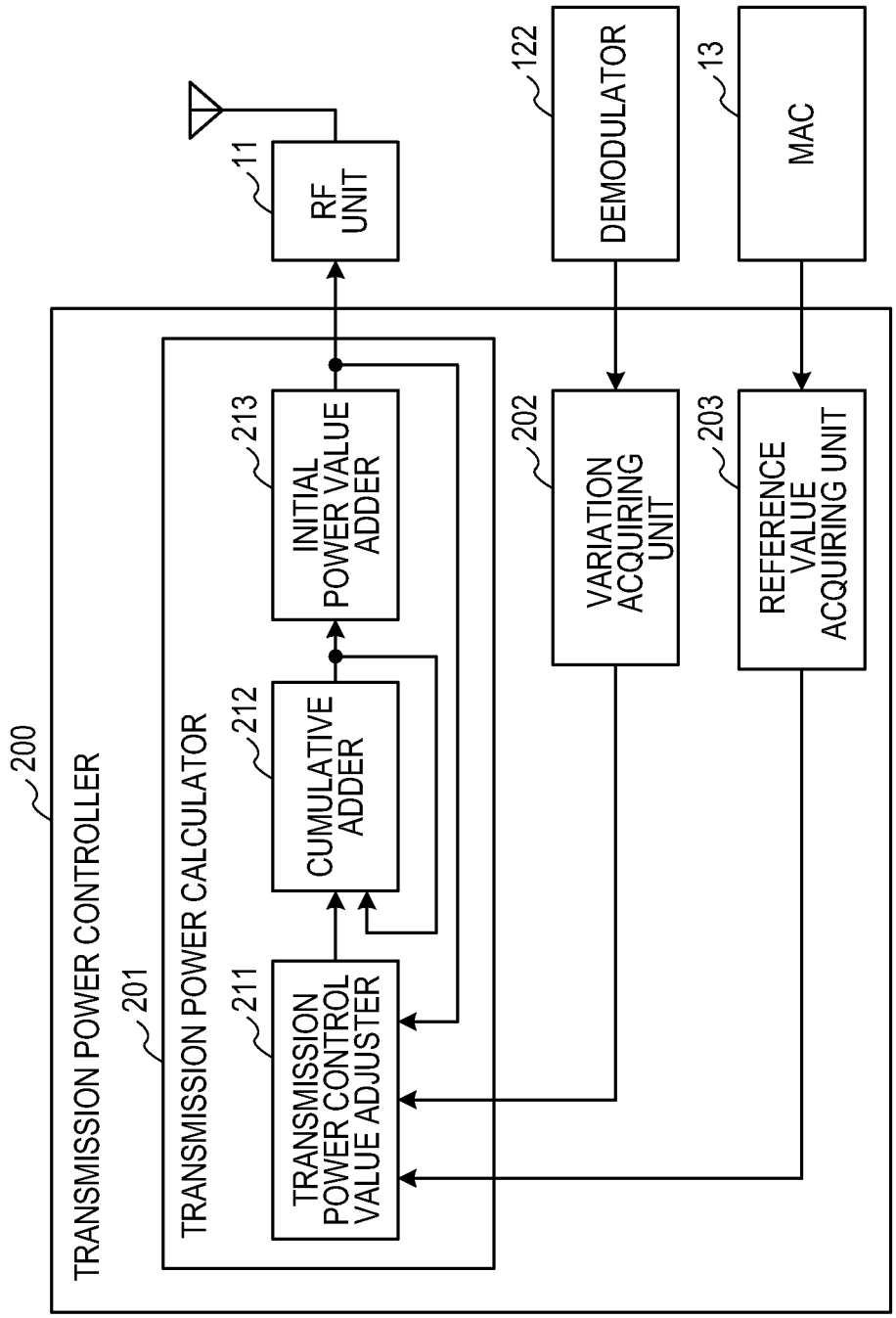
FIG. 3 is a block diagram of a transmission power controller in a mobile phone according to a first embodiment.

FIG. 3 is a block diagram of a transmission power controller in the mobile phone according to the first embodiment. In FIG. 3, for ease of understanding, components other than the RF unit 11 and the transmission power controller 200 are omitted.

As illustrated in FIG. 3, the transmission power controller 200 includes a transmission power calculator 201, a variation acquiring unit 202, and a reference value acquiring unit 203. The transmission power calculator 201 includes a transmission power control value adjuster 211, a cumulative adder 212, and an initial power value adder 213.

The variation acquiring unit 202 stores a variation calculation table representing the association between the TPC value and the variation in transmission power. The variation acquiring unit 202 acquires a control command for transmission power transmitted from the base station 2. The control command for transmission power is input for each subframe from the demodulator 122. This subframe corresponds to an example of a "given timing." The variation acquiring unit 202 then extracts a TPC value from the acquired control command for transmission power. The variation acquiring unit 202 then acquires, from the variation calculation table stored therein, the variation in transmission power associated with the extracted TPC value. The variation acquiring unit 202 then outputs the acquired variation to the transmission power control value adjuster 211.

The reference value acquiring unit 203 stores an association table 300 representing the relationship between the TA control and the reference value as depicted in FIG. 4. FIG. 4 depicts an example association table representing the relationship between the TA control and the reference value. The reference value is a threshold for determining whether transmission power is excessive. In other words, if the transmission power value exceeds the reference value, then it is determined that the transmission power is excessive.

Here, the association table 300 representing the relationship between the TA control and the reference value is described. In the association table 300 of this embodiment, values for TA control are intelligibly arranged in ascending order from the top to the bottom. In the association table 300, a TA control value 301 is the minimum value for TA control and ranges from 0 to 2564. A TA control value 303 is the maximum value for TA control and ranges from 17949 to 20512. Here, the mobile phone 1 is controlled such that the larger the value for TA, the earlier the transmission timing. In other words, it can be said that the larger the value for TA, the larger the distance between the mobile phone 1 and the base station 2. That is, as indicated by an arrow 310 to the right of the association table 300, the distance between the mobile phone 1 and the base station 2 increases from the top to the bottom of the association table 300.

In the case where the distance between the mobile phone 1 and the base station 2 is large, a large output is used. As a result, a large transmission power value is used. In this case, if the transmission power value is increased to some extent, the increased transmission power value is not excessive. Thus, the reference value is set high when the distance between the mobile phone 1 and the base station 2 is large. In contrast to this, in the case where the distance between the mobile phone 1 and the base station 2 is small, a small output is used with satisfactory results. As a result, the transmission power value is kept small. Accordingly, it can be said in the small distance case that the transmission power value is excessive when the transmission power value is small compared to the case where the distance between the mobile phone 1 and the base station 2 is large. Thus, the reference value is set low when the distance between the mobile phone 1 and the base station 2 is small.

In the association table 300, a reference value is given in association with each value for TA control. For example, a reference value 302 of −25 dBm is associated with the TA control value 301. A reference value 304 of +10 dBm is associated with the TA control value 303. That is, the smaller the value for TA control, namely, the smaller the distance between the mobile phone 1 and the base station 2, the smaller the reference value associated with the value for TA control. In contrast to this, the larger the value for TA, namely, the larger the distance between the mobile phone 1 and the base station 2, the larger the reference value associated with the value for TA control. Here, the association table may be made such that the value for TA control and the reference value associated with each other, for example, can vary upon receipt of an input by an operator.

The reference value acquiring unit 203 acquires a transmission timing control command from a timing control signal input for each subframe from the MAC 13. The reference value acquiring unit 203 then extracts a value for TA control from the acquired transmission timing control command. Subsequently, the reference value acquiring unit 203 acquires a reference value associated with the extracted value for TA control from the association table 300. For example, the reference value acquiring unit 203 acquires the reference value 302 of −25 dBm when the extracted value for TA control is the TA control value 301. Then, the reference value acquiring unit 203 outputs the acquired reference value to the transmission power control value adjuster 211.

The transmission power control value adjuster 211 stores in advance a variation to be used when the transmission power value is greater than the reference value. For example, the transmission power control value adjuster 211 stores 0.5 dBm, which is one-half of 1 dBm, or 0.25 dBm, which is a quarter of 1 dBm, for example, as the variation to be used when the transmission power value is greater than the reference value. Here, the variation to be used when the transmission power value is greater than the reference value is not limited as long as it is less than any variation specified by the base station 2. Here, the variation to be used when the transmission power value is greater than the reference value may be able to vary upon receipt of an input by an operator.

The transmission power control value adjuster 211 receives input of a variation in transmission power for every subframe from the variation acquiring unit 202. The transmission power control value adjuster 211 receives input of a reference value for every subframe from the reference value acquiring unit 203.

The transmission power control value adjuster 211 acquires a transmission power value output from the initial power value adder 213. Then, the transmission power control value adjuster 211 compares the acquired transmission power value to the reference value when the transmission power control value adjuster 211 receives an instruction for increasing the transmission power value from the base station 2. If the acquired transmission power value is less than the reference value, then the transmission power control value adjuster 211 outputs the received variation in transmission power to the cumulative adder 212. In contrast to this, if the acquired transmission power value is greater than the reference value, then the transmission power control value adjuster 211 outputs the stored variation. Here, while the transmission power control value adjuster 211 outputs the fixed variation that has been stored in advance in this embodiment if the acquired transmission power value exceeds the reference value, other methods may be employed. For example, a predetermined percentage of a variation specified by the base station 2 may be output as the variation.

When the transmission power control value adjuster 211 receives an instruction for decreasing the transmission power value from the base station 2, the transmission power control value adjuster 211 outputs a variation specified by the base station 2 to the cumulative adder 212. In the case where the transmission power value exceeding the reference value is reduced and, as a result, the transmission power value is less than the reference value, the transmission power control value adjuster 211 then outputs the variation specified by the base station 2 to the cumulative adder 212.

The cumulative adder 212 receives input of the variation from the transmission power control value adjuster 211. Further, the cumulative adder 212 acquires a cumulative value output in the immediately preceding subframe by feedback. The cumulative adder 212 then adds the received variation to the cumulative value output in the immediately preceding subframe to calculate a cumulative value in this subframe. The cumulative adder 212 then outputs the calculated cumulative value to the initial power value adder 213.

The initial power value adder 213 stores an initial power value in advance. The initial power value adder 213 receives input of the cumulative value from the cumulative adder 212. The initial power value adder 213 then adds the received cumulative value to the initial power value stored in advance to calculate a transmission power value. Subsequently, the initial power value adder 213 outputs the calculated transmission power value to the RF unit 11. The initial power value adder 213 also outputs the transmission power value, which has been output to the RF unit 11, to the transmission power control value adjuster 211.

Figure 5:
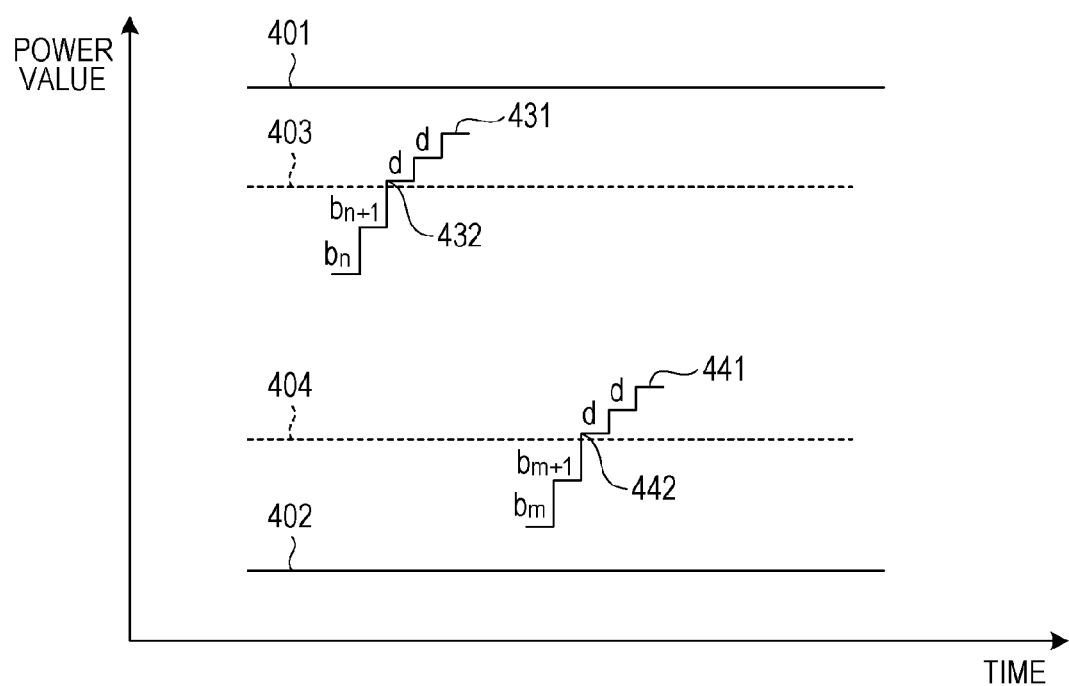
FIG. 5 is a diagram for explaining adjustment of the transmission power value in the first embodiment.

FIG. 5 is a diagram for explaining adjustment of the transmission power value in the first embodiment. In FIG. 5, the vertical axis represents the transmission power value, and the horizontal axis represents time. A graph 431 represents variations in transmission power in the case where the distance between the mobile phone 1 and the base station 2 is large. A graph 441 represents variations in transmission power in the case where the distance between the mobile phone 1 and the base station 2 is small. A solid line 401 represents the maximum of the transmission power value. A solid line 402 represents the minimum of the transmission power value. Further, a reference value 403 represents a reference value for the graph 431. A reference value 404 represents a reference value for the graph 441. That is, in the case where the distance between the mobile phone 1 and the base station 2 is large as in the graph 431, a reference value that the transmission power control value adjuster 211 receives from the reference value acquiring unit 203 is high. In contrast to this, in the case where the distance between the mobile phone 1 and the base station 2 is small as in the graph 441, a reference value that the transmission power control value adjuster 211 receives from the reference value acquiring unit 203 is low.

In the case where the distance between the mobile phone 1 and the base station 2 is large as in the graph 431, the transmission power control value adjuster 211 outputs variations specified by the base station 2 to the cumulative adder 212 until the transmission power value exceeds the reference value 403, which is a higher reference value. In the graph 431, $b_n$ and $b_{n+1}$ represent variations specified by the base station 2. Accordingly, the transmission power value increases by the variations specified by the base station 2. That is, the transmission power value increases by $b_n$ and $b_{n+1}$. After the transmission power value exceeds the reference value 403 at a point 432, the transmission power control value adjuster 211 outputs a predetermined variation (here assumed to be "d") to the cumulative adder 212. That is, the transmission power value increases by d after the transmission power value exceeds the reference value 403. Thereafter, until the transmission power value is reduced according to an instruction from the base station 2 and resultantly becomes less than the reference value 403, the transmission power control value adjuster 211 outputs the variations of d to the cumulative adder 212 when the base station 2 instructs the transmission power control value adjuster 211 to increase the transmission power value.

In the case where the distance between the mobile phone 1 and the base station 2 is small as in the graph 441, the transmission power control value adjuster 211 outputs variations specified by the base station 2 to the cumulative adder 212 until the transmission power value exceeds the reference value 404, which is a lower reference value. In the graph 441, $b_m$ and $b_{m+1}$ represent variations specified by the base station 2. Accordingly, the transmission power value increases by the variations specified by the base station 2. That is, the transmission power value increases by $b_m$ and $b_{m+1}$. After the transmission power value exceeds the reference value 404 at a point 442, the transmission power control value adjuster 211 outputs the predetermined variation of d to the cumulative adder 212. That is, the transmission power value increases by d after the transmission power value exceeds the reference value 404. Thereafter, until the transmission power value is reduced according to an instruction from the base station 2 and resultantly becomes less than the reference value 404, the transmission power control value adjuster 211 outputs variations of d to the cumulative adder 212 when the base station 2 instructs the transmission power control value adjuster 211 to increase the transmission power value.

Figure 6:
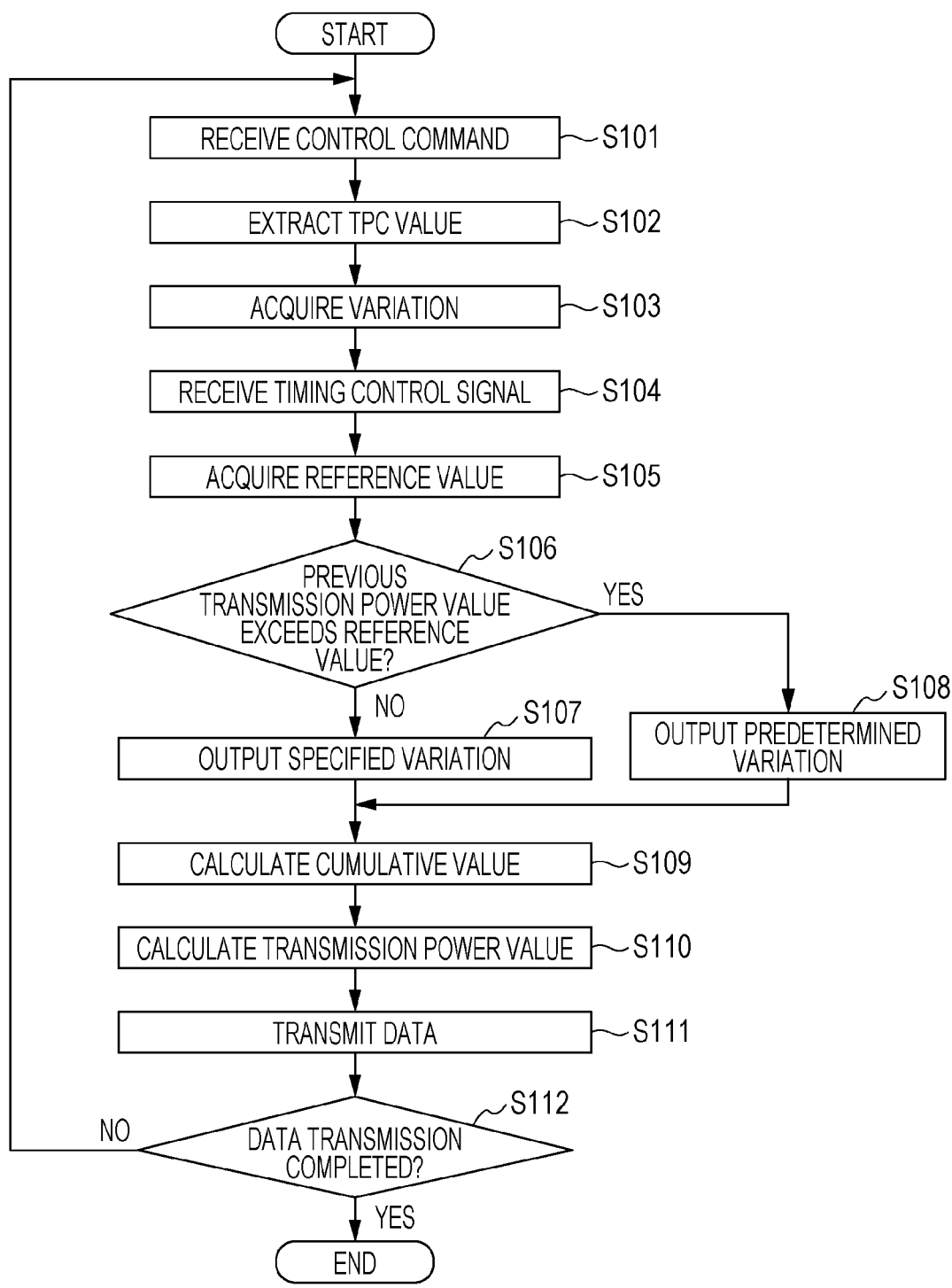
FIG. 6 is a flowchart of a process for calculating transmission power by the transmission power controller according to the first embodiment.

With reference to FIG. 6, a process for calculating transmission power performed by the transmission power controller according to this embodiment will next be described. FIG. 6 is a flowchart of the process for calculating transmission power performed by the transmission power controller according to the first embodiment. Here follows a description of a case in which only an instruction for increasing the transmission power value has been sent from the base station.

The RF unit 11 receives a control command for transmission power from the base station 2 via an antenna (step S101). Thereafter, the demodulator 122 outputs the control command for transmission power to the variation acquiring unit 202.

The variation acquiring unit 202 extracts a TPC value from the control command for transmission power input from the demodulator 122 (step S102). The variation acquiring unit 202 then acquires a variation associated with the extracted TPC value from the variation calculation table (step S103). Subsequently, the variation acquiring unit 202 outputs the acquired variation to the transmission power control value adjuster 211.

The RF unit 11 also receives a timing control signal from the base station 2 (step S104). Then, the MAC 13 outputs a transmit timing control command included in the timing control signal to the reference value acquiring unit 203.

The reference value acquiring unit 203 acquires a value for TA control from the transmit timing control command input from the MAC 13. The reference value acquiring unit 203 then acquires a reference value associated with the acquired value for TA control from the association table representing the relationship between the TA control and the reference value (step S105). Subsequently, the reference value acquiring unit 203 outputs the acquired reference value to the transmission power control value adjuster 211.

The transmission power control value adjuster 211 receives input of the variation from the variation acquiring unit 202. The transmission power control value adjuster 211 also receives input of the reference value from the reference value acquiring unit 203. Further, the transmission power control value adjuster 211 receives feedback of a transmission power value output by the initial power value adder 213. Then, the transmission power control value adjuster 211 determines whether the fed-back transmission power value, that is, the previous transmission power value, exceeds the received reference value (step S106).

If the transmission power value does not exceed the reference value (step S106: No), then the transmission power control value adjuster 211 outputs a variation specified by the base station 2 to the cumulative adder 212 (step S107). In contrast to this, if the transmission power value exceeds the reference value (step S106: Yes), then the transmission power control value adjuster 211 outputs a predetermined variation that is stored therein to the cumulative adder 212 (step S108).

The cumulative adder 212 calculates a cumulative value in the current subframe by adding the variation, which has been input from the transmission power control value adjuster 211, to the fed-back cumulative value in the immediately preceding subframe (step S109). Then, the cumulative adder 212 outputs the calculated cumulative value to the initial power value adder 213, and feeds back that cumulative value to the cumulative adder 212 itself.

The initial power value adder 213 calculates a transmission power value by adding the cumulative value received from the cumulative adder 212 to an initial power value stored in advance (step S110). The initial power value adder 213 then outputs the calculated transmission power value to the RF unit 11, and feeds back that transmission power value to the transmission power control value adjuster 211.

Using the transmission power value received from the initial power value adder 213, the RF unit 11 transmits data in the current subframe to the base station 2 (step S111).

The transmission power controller 200 determines whether transmission of the data to the base station 2 has been completed (step S112). If the transmission power controller 200 determines that the data transmission has not yet been completed (step S112: No), then the process returns to step S101. In contrast to this, if the data transmission has been completed (step S112: Yes), then the transmission power controller 200 finishes the process for calculating transmission power.

Steps S101 to S111 will be repeated for each subframe.

Here, in the flowchart of FIG. 6, processing from acquiring a timing control signal to acquiring a reference value (steps S104 to S105) are performed after processing from receiving a control command to acquiring a variation (steps S101 to S103). However, steps S101 to S103 and steps S104 to S105 may be performed in the reverse order, or may be performed in parallel.

In the flow of FIG. 6, after the predetermined variation is output, a determination as to whether the transmission power value exceeds the reference value is performed. This may be replaced by another method. For example, when the predetermined variation is output, the transmission power control value adjuster 211 may output the predetermined variation without performing the determination from the next time. In the flow of FIG. 6, however, if the transmission power value exceeds the reference value, the transmission power value will exceed the reference value also in the next determination. No problem therefore arises.

As described above, using a reference value associated with a value for TA control specified by a base station, the wireless communication device according to this embodiment determines whether the transmission power is excessive. If the transmission power is excessive, then the wireless communication device suppresses an increase in transmission power. In this way, it is possible to determine excessive transmission power in accordance with the distance between the wireless communication device and the base station, making it appropriate to control UL transmission power. When the transmission power value exceeds the reference value, a reduced variation is used. This enables control to be more detailed than in the case where increasing transmission power is prohibited if it is determined that the transmission power is excessive. For example, in the case where a variation specified by the base station is requested although the wireless communication device determines that transmission power is excessive, the wireless communication device according to this embodiment gradually increases the transmission power. In this way, the requested variation can be achieved.

Second Embodiment

Figure 7:
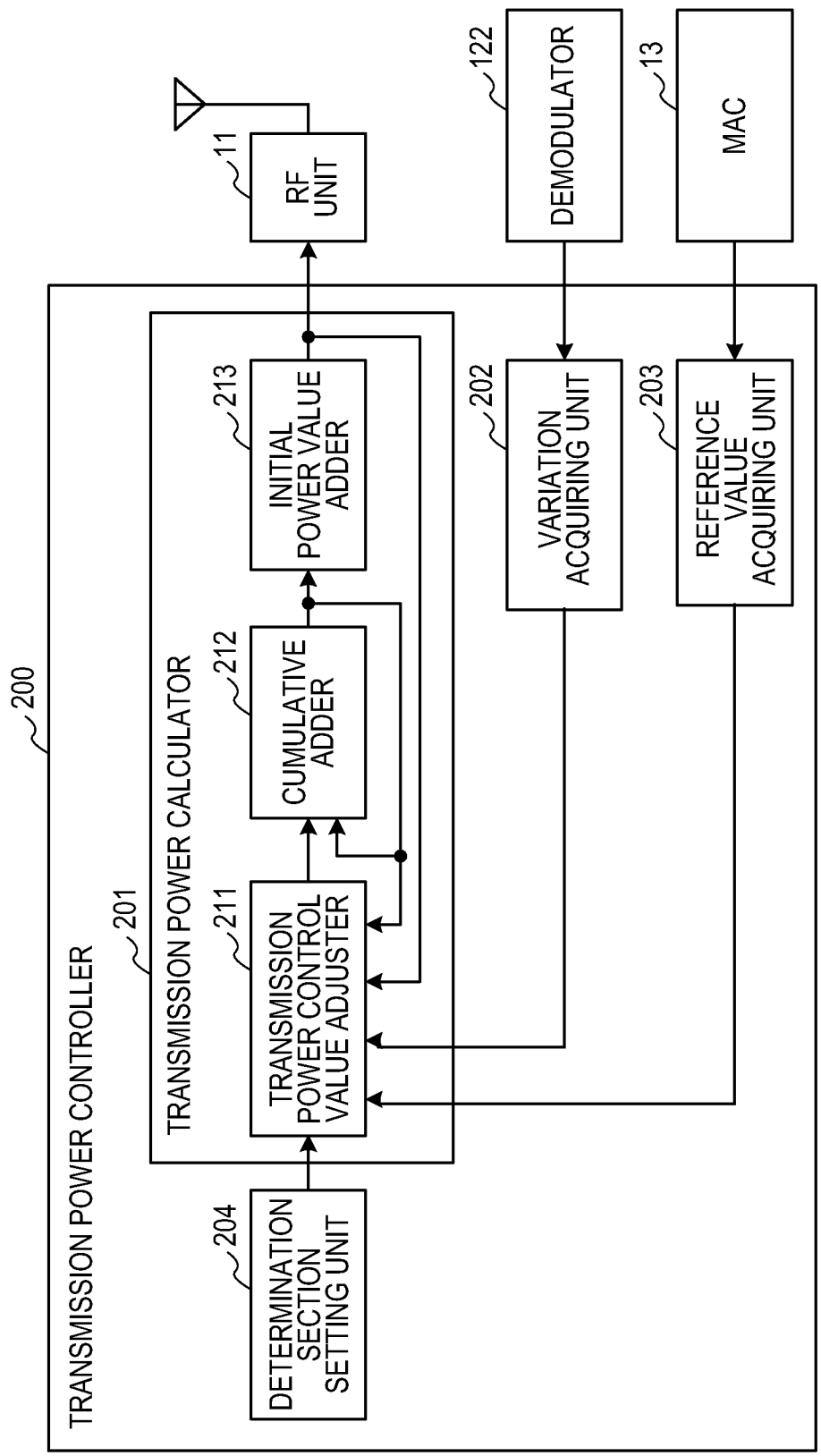
FIG. 7 is a block diagram of the transmission power controller in a mobile phone according to a second embodiment.

FIG. 7 is a block diagram of the transmission power controller in a mobile phone according to a second embodiment. The transmission power controller 200 in the wireless communication device of this embodiment differs from that of the first embodiment in that an increase in cumulative value is used for a determination as to whether transmission power is excessive, in addition to the determination in the first embodiment as to whether transmission power is excessive. Under such a circumstance, a determination on excessive transmission power by the transmission power controller 200 will be mainly described below. In FIG. 7, components denoted by the same reference numerals have the same functions as the corresponding components as in FIG. 3 unless otherwise specified. The mobile phone 1 of this embodiment wirelessly communicates with the base station 2, as described in the first embodiment with reference to FIG. 1. The overall configuration of the mobile phone 1 of this embodiment is similar to that described in the first embodiment with reference to FIG. 2.

In addition to the components in the configuration of the first embodiment, the transmission power controller 200 according to this embodiment includes a determination section setting unit 204.

The determination section setting unit 204 determines a timing at which a determination as to whether an increase in cumulative value is excessive is started. In this embodiment, the determination section setting unit 204 assumes that the start of each frame in transmission data input to the modulator 125 is a timing at which a determination as to whether an increase in cumulative value is excessive is started. For example, given that each frame has a length of 10 ms, the determination section setting unit 204 assumes that the timing at which the initial subframe begins is the timing at which the initial frame begins. Every 10 ms after the timing, the start of a frame is obtained. As a timing at which a determination as to whether an increase in cumulative value is excessive is started, the determination section setting unit 204 uses the start of the next frame. The determination section setting unit 204 notifies the transmission power control value adjuster 211 of the start of each frame as a timing at which a counter included in the transmission power control value adjuster 211 is to be reset.

The transmission power control value adjuster 211 has a counter for time measurement inside thereof. The transmission power control value adjuster 211 stores a predetermined time period for which an increase in cumulative value is determined. Further, the transmission power control value adjuster 211 stores a predetermined cumulative threshold to be used for determining whether an increase in cumulative value is excessive. The cumulative threshold may be able to be changed by an input from an operator, for example.

The transmission power control value adjuster 211 receives input of a variation from the variation acquiring unit 202. The transmission power control value adjuster 211 also receives input of a reference value from the reference value acquiring unit 203. Further, the transmission power control value adjuster 211 receives, from the determination section setting unit 204, notification about a timing at which the counter included in the transmission power control value adjuster 211 is to be reset.

The transmission power control value adjuster 211 also receives feedback of a transmission power value output by the initial power value adder 213. The transmission power control value adjuster 211 further receives feedback of a cumulative value output by the cumulative adder 212.

The transmission power control value adjuster 211 resets the counter included therein at the timing of which the transmission power control value adjuster 211 has been notified by the determination section setting unit 204. The transmission power control value adjuster 211 stores the cumulative value at the time of resetting the counter. Then, the transmission power control value adjuster 211 calculates an increase in cumulative value by subtracting the cumulative value at the time of resetting the counter from the cumulative value accumulated through feedback after the resetting until the counter has measured the predetermined time period for which the increase in cumulative value is determined. Then, the transmission power control value adjuster 211 determines whether the calculated increase in cumulative value exceeds the stored predetermined cumulative threshold.

If the increase in cumulative value does not exceed the cumulative threshold, then the transmission power control value adjuster 211 outputs a variation specified by the base station 2 to the cumulative adder 212.

In contrast to this, if the increase in cumulative value exceeds the cumulative threshold, then the transmission power control value adjuster 211 determines that the increase in cumulative value is excessive.

If the increase in cumulative value is excessive, then the transmission power control value adjuster 211 determines whether the transmission power value in the immediately preceding subframe exceeds the reference value. If the transmission power value in the immediately preceding subframe does not exceed the reference value, then the transmission power control value adjuster 211 outputs the variation specified by the base station 2 to the cumulative adder 212.

In contrast to this, if the transmission power value in the immediately preceding subframe exceeds the reference value, then the transmission power control value adjuster 211 outputs a stored variation to the cumulative adder 212.

Figure 8:
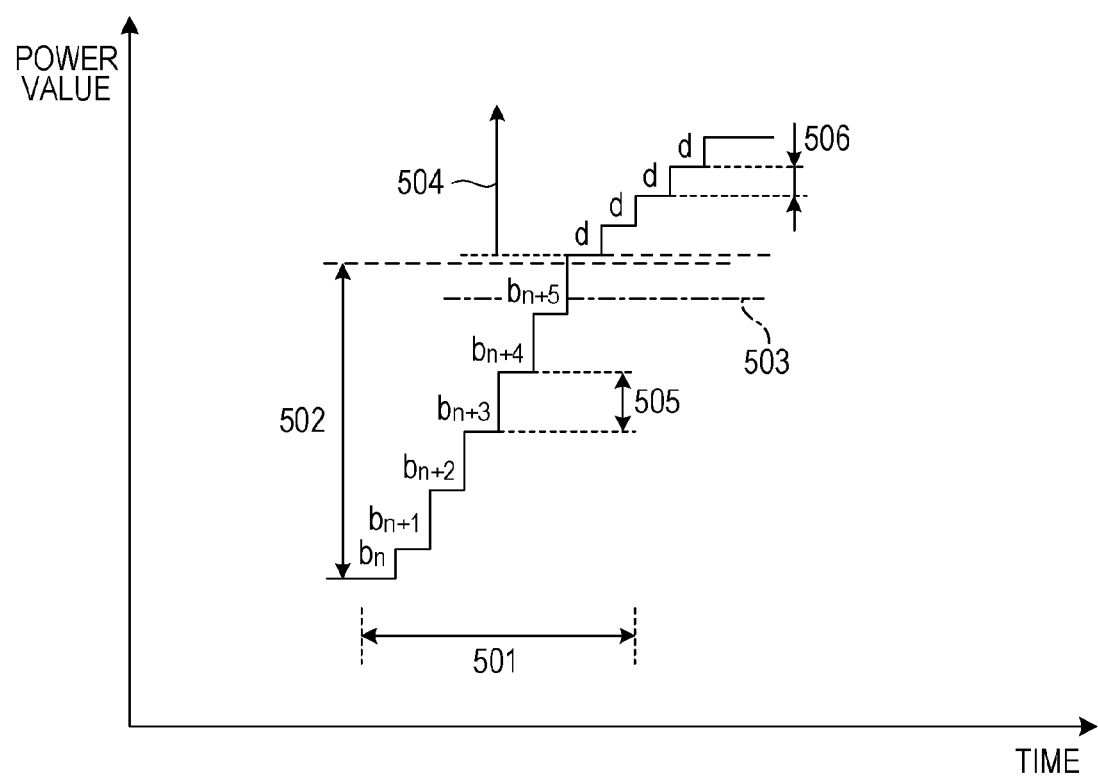
FIG. 8 is a diagram for explaining adjustment of the transmission power value in a second embodiment.

With reference to FIG. 8, adjustment of the transmission power value in the second embodiment will next be described. FIG. 8 is a diagram for explaining adjustment of the transmission power value in the second embodiment. In FIG. 8, the vertical axis represents the transmission power value, and the horizontal axis represents time. A section 501 represents a section during which it is determined whether an increase in cumulative value is excessive. That is, a left end of the section 501 illustrated in FIG. 8 indicates a timing at which a determination as to whether an increase in cumulative value is excessive is started. The timing is specified by the determination section setting unit 204. In this embodiment, the left end of the section 501 illustrated in FIG. 8 corresponds to the start of the frame. The transmission power control value adjuster 211 determines whether an increase in cumulative value exceeds a cumulative threshold 502 during the section 501. Further, a reference value 503 represents a reference value for the transmission power value indicated in FIG. 8.

Then, the transmission power control value adjuster 211 determines whether an increase in cumulative value from the cumulative value at the time of starting the determination exceeds the cumulative threshold 502. The transmission power control value adjuster 211 outputs variations specified by the base station 2 to the cumulative adder 212 until the increase exceeds the accumulation threshold 502. In the graph of FIG. 8, $b_n$ to $b_{n+5}$ represent variations specified by the base station 2. Thus, the transmission power value will increase by the variations specified by the base station 2. That is, the transmission power value and the cumulative value increase by $b_n$, $b_{n+1}$, $b_{n+2}$, $b_{n+3}$, $b_{n+4}$, and $b_{n+5}$. For example, when the transmission power control value adjuster 211 inputs the variation of $b_{n+3}$ to the cumulative adder 212, the cumulative value increases by a variation 505. Then, if the increase in cumulative value exceeds the cumulative threshold 502, then the transmission power control value adjuster 211 determines whether the transmission power value at that time exceeds the reference value 503. In the graph of FIG. 8, since the transmission power value at that time exceeds the reference value 503, the transmission power control value adjuster 211 outputs a predetermined variation (here, assumed to be "d") to the cumulative adder 212. That is, the transmission power value increases by d as indicated by a variation 506 after the transmission power value exceeds the reference value 503. Thereafter, until the transmission power value is reduced according to an instruction from the base station 2 and resultantly becomes less than the reference value 503, the transmission power control value adjuster 211 outputs the variation of d to the cumulative adder 212 when the base station 2 instructs the transmission power control value adjuster 211 to increase the transmission power value.

Figure 9:
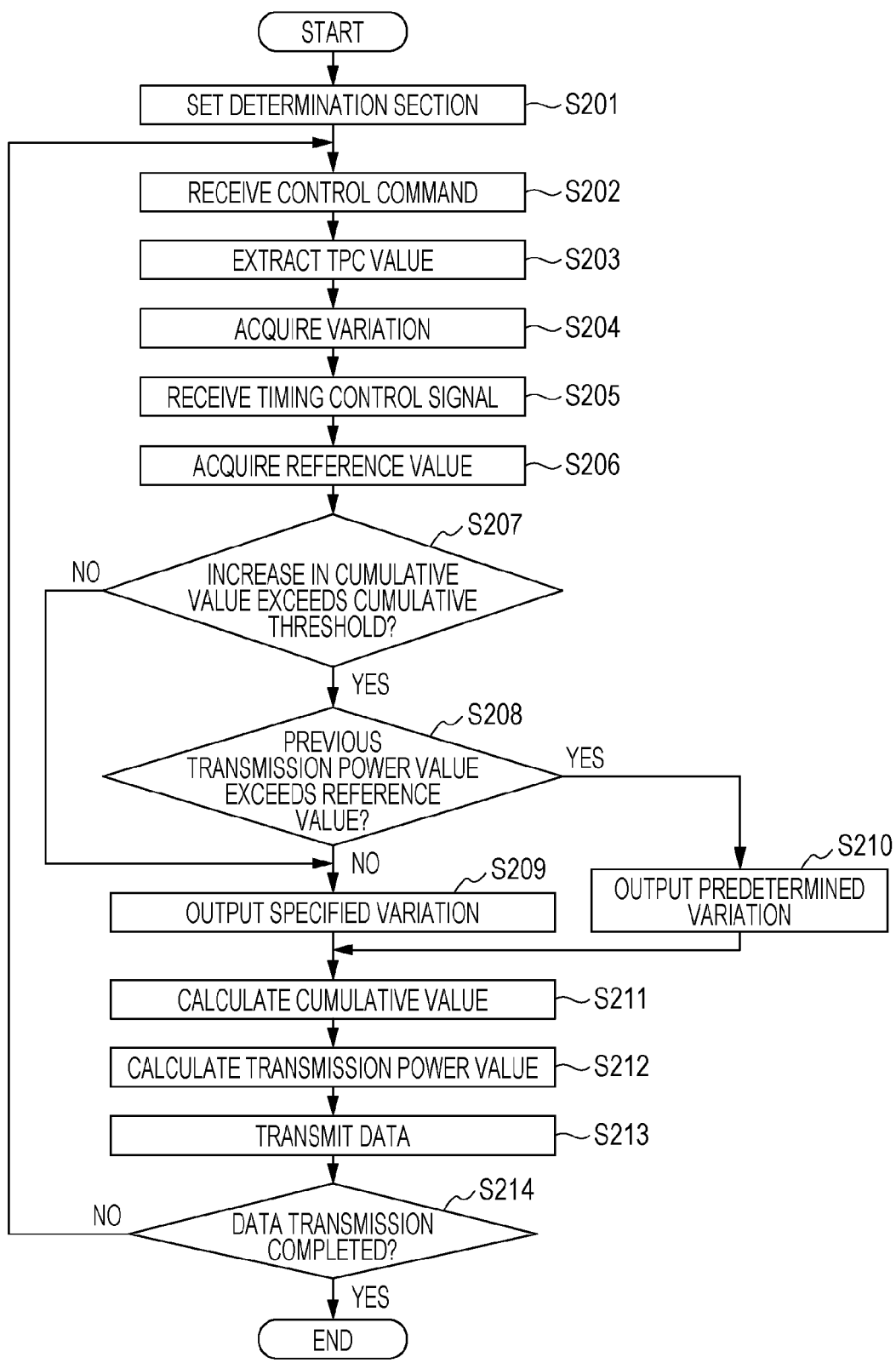
FIG. 9 is a flowchart of a process for calculating transmission power by the transmission power controller according to the second embodiment.

With reference to FIG. 9, a process for calculating transmission power performed by the transmission power controller according to this embodiment will next be described. FIG. 9 is a flowchart of the process for calculating transmission power performed by the transmission power controller according to the second embodiment. FIG. 9 represents the flow of processing in a single determination section. Here follows a description of a case in which only an instruction for increasing the transmission power value has been sent from the base station.

The transmission power control value adjuster 211 resets its counter at the timing at which a determination as to whether an increase in cumulative value is excessive is started, thereby setting a determination section (step S201). The timing has been received from the determination section setting unit 204.

The RF unit 11 receives a control command for transmission power from the base station 2 via an antenna (step S202). Thereafter, the demodulator 122 outputs the received control command for transmission power to the variation acquiring unit 202.

The variation acquiring unit 202 extracts a TPC value from the control command for transmission power input from the demodulator 122 (step S203). The variation acquiring unit 202 then acquires a variation associated with the extracted TPC value from the variation calculation table (step S204). Subsequently, the variation acquiring unit 202 outputs the acquired variation to the transmission power control value adjuster 211.

The RF unit 11 receives a timing control signal from the base station 2 (step S205). Then, the MAC 13 outputs a transmission timing control command included in the timing control signal to the reference value acquiring unit 203.

The reference value acquiring unit 203 acquires a value for TA control from the transmit timing control command input from the MAC 13. The reference value acquiring unit 203 then acquires a reference value associated with the acquired value for TA control from the association table representing the relationship between the TA control and the reference value (step S206). Subsequently, the reference value acquiring unit 203 outputs the acquired reference value to the transmission power control value adjuster 211.

The transmission power control value adjuster 211 receives input of the variation from the variation acquiring unit 202. The transmission power control value adjuster 211 also receives input of the reference value from the reference value acquiring unit 203. The transmission power control value adjuster 211 also receives feedback of a cumulative value output by the cumulative adder 212. Further, the transmission power control value adjuster 211 also receives feedback of a transmission power value output by the initial power value adder 213. Then, the transmission power control value adjuster 211 determines whether an increase in cumulative value calculated by subtracting the cumulative value at the time of resetting the counter from the fed-back cumulative value exceeds the cumulative threshold (step S207).

If the increase in cumulative value does not exceed the cumulative threshold (step S207: No), then the transmission power control value adjuster 211 proceeds to step S209.

In contrast to this, if the increase in cumulative value exceeds the cumulative threshold (step S207: Yes), then the transmission power control value adjuster 211 determines whether the fed-back transmission power value, that is, the previous transmission power value, exceeds the received reference value (step S208).

If the previous transmission power value does not exceed the reference value (step S208: No), then the transmission power control value adjuster 211 outputs a variation specified by the base station 2 to the cumulative adder 212 (step S209). In contrast to this, if the previous transmission power value exceeds the reference value (step S208: Yes), then the transmission power control value adjuster 211 outputs a predetermined variation that is stored therein to the cumulative adder 212 (step S210).

The cumulative adder 212 calculates a cumulative value in the current subframe by adding the variation, which has been input from the transmission power control value adjuster 211, to the fed-back cumulative value in the immediately preceding subframe (step S211). Then, the cumulative adder 212 outputs the calculated cumulative value to the initial power value adder 213, and feeds back the cumulative value to the cumulative adder 212 itself.

The initial power value adder 213 calculates a transmission power value by adding the cumulative value received from the cumulative adder 212 to an initial power value stored in advance (step S212). The initial power value adder 213 then outputs the calculated transmission power value to the RF unit 11, and feeds back that transmission power value to the transmission power control value adjuster 211.

Using the transmission power value received from the initial power value adder 213, the RF unit 11 transmits data in the current subframe to the base station 2 (step S213).

The transmission power controller 200 determines whether transmission of the data to the base station 2 has been completed (step S214). If the transmission power controller 200 determines that the data transmission has not yet been completed (step S214: No), then the process returns to step S202. In contrast to this, if the data transmission has been completed (step S214: Yes), then the transmission power controller 200 finishes the process for calculating a transmission power.

Here, in the flow of FIG. 9, after the predetermined variation is output, a determination as to whether the increase in cumulative value exceeds the cumulative threshold and a determination as to whether the transmission power value exceeds the reference value are performed. This may be replaced by another method. For example, when the predetermined variation is output, the transmission power control value adjuster 211 may output the predetermined variation without performing the determinations from the next time. In the flow of FIG. 9, however, if the increase in cumulative value exceeds the cumulative threshold and further the transmission power value exceeds the reference value, the increase in cumulative value will exceed the cumulative threshold and the transmission power value will exceed the reference value next time. No problem therefore arises.

As described above, using a reference value associated with a value for TA control specified by a base station and an increase in cumulative value of variations, the wireless communication device according to this embodiment determines whether the transmission power is excessive. If the transmission power is excessive, then the wireless communication device suppresses an increase in transmission power. In this way, it is possible to exclude cases where variations are gradually added and resultantly the reference value is exceeded, so that it is possible to determine that the transmission power is excessive only when many variations are added for a short time. Accordingly, it is possible to determine excessive transmission power in accordance with the distance between the wireless communication device and the base station, and, in addition to this, it is possible to control UL transmission power more appropriately.

Hardware Configuration

Figure 10:
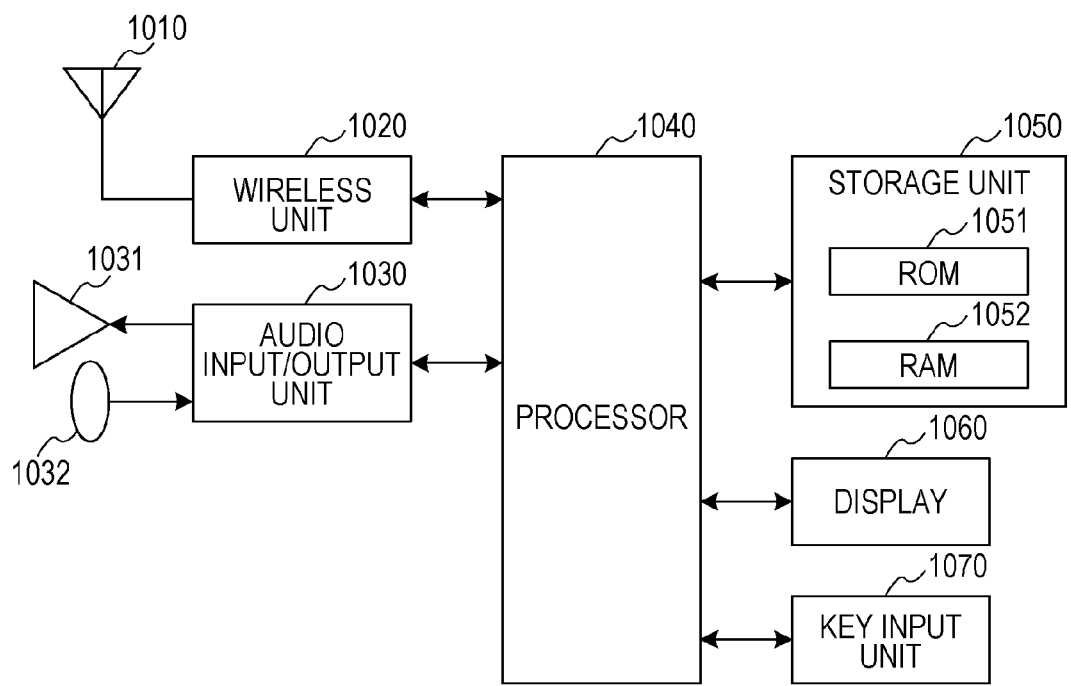
FIG. 10 is a block diagram of a hardware configuration of a mobile phone.

With reference to FIG. 10, the hardware configuration of a mobile phone according to this embodiment will be described. FIG. 10 is a block diagram of a hardware configuration of the mobile phone.

The mobile phone according to this embodiment includes an antenna 1010, a wireless unit 1020, an audio input/output unit 1030, a speaker 1031, a microphone 1032, a processor 1040, a storage unit 1050, a display 1060, and a key input unit 1070.

The wireless unit 1020, the audio input/output unit 1030, the storage unit 1050, the display 1060, and the key input unit 1070 are each connected with the processor 1040. The antenna 1010 is connected to the wireless unit 1020. The speaker 1031 and the microphone 1032 are connected to the audio input/output unit 1030.

The wireless unit 1020 communicates with other wireless communication devices using a mobile communication network via the antenna 1010. For example, the function of the RF unit 11 illustrated in FIG. 2 is implemented by the wireless unit 1020 and the processor 1040.

The displays 1060 is a graphic display screen such as a liquid crystal display (LCD). The key input unit 1070 is a keypad, for example. An operator operates the key input unit 1070 to input a character, an executive instruction, and other information.

The audio input/output unit 1030 outputs sound sent from the party at the other end of a phone from the speaker 1031 during a phone conversation, for example. The audio input/output unit 1030 receives input of an operator's sound from the microphone 1032, for example.

The storage unit 1050 has a read only memory (ROM) 1051 and a random access memory (RAM) 1052.

The processor 1040 and the storage unit 1050 implement the functions of the searching unit 121, the demodulator 122, the decoder 123, the coder 124, the modulator 125, and the transmission power controller 200 illustrated in FIG. 2, for example. For example, the ROM 1051 stores thereon various programs that implement processing by the components of the transmission power controller 200 illustrated in FIG. 3. Then, the processor 1040 and the RAM 1052 read and run these various programs, thereby generating processes for implementing the functions mentioned above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication device comprising:
a reference value acquiring unit configured to receive from a base station a timing adjustment value for use in adjusting a timing at which a transmission signal is to be transmitted, and acquire a reference value associated with the received timing adjustment value, the reference value being a threshold for determining whether a transmission power is excessive;
a variation acquiring unit configured to receive a transmission power control command transmitted by the base station at each given timing, and sequentially acquire a variation in transmission power from the received transmission power control command; and
a transmission power calculator configured to vary a transmission power value on the basis of the variation in transmission power acquired by the variation acquiring unit when the transmission power value does not exceed the reference value acquired by the reference value acquiring unit, and configured to vary the transmission power value on the basis of a variation less than the variation in transmission power acquired by the variation acquiring unit when the transmission power value exceeds the reference value acquired by the reference value acquiring unit.

2. The wireless communication device according to claim 1,
wherein the transmission power calculator determines whether the transmission power value exceeds the reference value when an increase in transmission power value in a given period exceeds a given value.

3. The wireless communication device according to claim 1,
wherein the transmission power calculator uses a predetermined value as the variation less than the variation in transmission power acquired by the variation acquiring unit.

4. The wireless communication device according to claim 1,
wherein the transmission power calculator uses a value of a given percentage of the variation in transmission power acquired by the variation acquiring unit, as the variation less than the variation in transmission power acquired by the variation acquiring unit.

5. A mobile phone comprising:
a wireless communication unit configured to transmit and receive data to and from a base station; and
a base band processing unit configured to perform base band processing of the data received and to be transmitted by the wireless communication unit, the base band processing unit including
a reference value acquiring unit configured to receive from the base station a timing adjustment value for use in adjusting a timing at which a transmission signal is to be transmitted, and acquire a reference value associated with the received timing adjustment value, the reference value being a threshold for determining whether transmission power is excessive,
a variation acquiring unit configured to receive a transmission power control command transmitted by the base station at each given timing, and sequentially acquire a variation in transmission power from the received transmission power control command, and
a transmission power calculator configured to vary a transmission power value on the basis of the variation in transmission power acquired by the variation acquiring unit when the transmission power value does not exceed the reference value acquired by the reference value acquiring unit, and configured to vary the transmission power value on the basis of a variation less than the variation in transmission power acquired by the variation acquiring unit if the transmission power value exceeds the reference value acquired by the reference value acquiring unit.

6. A method of controlling a wireless communication device, the method comprising causing the wireless communication device to perform:
receiving from a base station a timing adjustment value for use in adjusting a timing at which a transmission signal is to be transmitted;
acquiring a reference value associated with the received timing adjustment value, the reference value being a threshold for determining whether transmission power is excessive;
receiving a transmission power control command transmitted by the base station at each given timing, and sequentially acquiring a variation in transmission power from the received transmission power control command;
varying a transmission power value on the basis of the acquired variation in transmission power when the transmission power value does not exceed the reference value; and varying the transmission power value on the basis of a variation less than the acquired variation in transmission power when the transmission power value exceeds the reference value.

* * * * *